2,901,441

PREPARATION OF AN OXIDATION CATALYST

Wendell W. Waterman, Arlington Heights, Ill., assignor to Publicker Industries, Inc., Philadelphia, Pa., a corporation of Pennsylvania No Drawing. Application January 28, 1953
Serial No. 333,822

4 Claims. (Cl. 252—463)

This invention relates to a useful oxidation catalyst and to a process for its preparation, and more particularly to a highly active and selective catalyst for use in catalyzing the oxidation of olefins to olefin oxides, such as the oxidation of ethylene to ethylene oxide and the process for preparing such a catalyst.

This application is a continuation-in-part of my earlier application U.S. Serial No. 21,745, filed April 17, 1948 and now abandoned.

The advent of a variety of recent commercial processes involving olefinic hydrocarbons, such as the various cracking processes in the petroleum refining arts, has made a large amount of low molecular weight normally gaseous olefins such as ethylene available. It is desirable to convert these low molecular olefins to more economically valuable compounds and in recent years large scale efforts have been expended in this direction.

In particular, efforts have been undertaken to oxidize these olefins into their corresponding oxides. The olefin oxides are valuable compounds per se, as solvents, extractants, fumigants, insecticides and the like. Moreover, they are valuable intermediates for the preparation of a wide variety of useful organic compounds such as alcohols, glycols, aldehydes, carboxylic acids, ethers, esters, alkyloamines, resins, polymers and the like.

The commercial oxidation processes have conventionally involved oxidation of olefins in the presence of an oxidation catalyst such as silver, and extensive research on the development of superior silver oxidation catalysts has been undertaken. However, the vast majority of conventional silver oxidation catalysts have not proven fully satisfactory, and olefin oxidation processes using such catalysts have not been productive of adequate yields of olefin oxide.

A variety of processes have been developed to prepare such catalysts. For example, one such process is disclosed in U.S. Patent 2,040,782 to A. J. van Peski which issued on May 12, 1936. The catalyst used in this process is prepared by the thermal decomposition of a solid thermally-decomposable organic silver compound to elemental silver. Thus, the silver salt of a low molecular weight organic carboxylic acid, such as silver oxalate is prepared, such as by the separation of precipitated silver oxalate from an aqueous solution, and then the solid silver salt is decomposed to elemental silver by the application of heat. The elemental silver catalyst thus obtained may be commingled with particles of an inert carrier to increase its volume or more preferably, utilized per se, as the oxidation catalyst.

Numerous other methods have been proposed for preparing silver oxidation catalysts and a wide variety of silver oxidation catalysts have been prepared. Thus, catalysts comprising silver deposited upon carriers or supports such as silica gel and pumice have been recommended, but these catalysts have been found to promote formation of extensive amounts of undesirable gaseous by-products such as carbon dioxide, when utilized for the oxidation of olefins. Aluminum oxide has also been recommended as a support material. However, there are certain forms of this compound, such as those known as the beta and gamma forms, which when impregnated with silver by conventional procedures, exhibit little if any catalytic activity for the oxidation of olefins. Alpha aluminum oxide has also been recommended as a carrier for catalysts used in the oxidation of olefins. However, I have found that many forms of alpha alumina do not comprise valuable carriers for olefin oxidation processes.

An object of my invention is to provide a highly active and selective catalyst for the oxidation of olefins to olefin oxides.

Another object of my invention is to provide a method for the preparation of a highly active and selective catalyst for the oxidation of olefins to olefin oxides.

These and other objects are accomplished by my invention. The process of my invention is a method for preparing a highly active and selective catalyst for use in the oxidation of olefins to olefin oxides. The process of my invention comprises impregnating a carrier selected from the group consisting of alpha alumina and silicon carbide with an auqeous solution of a water soluble silver salt of a relatively low molecular weight organic carboxylic acid. It is essential for the purposes of my invention that the carrier have an average porosity of at least 35%, and preferably from 35 to 65%. While any such water soluble silver salt capable of forming concentrated aqueous solution having upwards of about 20 weight percent of dissolved salt can be used, silver lactate has been found to be most useful for the aforementioned purpose, especially when employed in the form of an aqueous solution having a weight percent concentration of the order of 50% to 65%. After the impregnation, the impregnated carrier is dried and heated for a time sufficient to remove the anionic constituent of the silver salt, and to deposit elemental silver in a highly active form upon the surface and throughout the pores of the carrier. A temperature of up to about 425° C., and preferably about 350° C. to 425° C. is most advantageous for effecting the aforementioned drying and heating. Moreover, it is preferable to effect the drying and heating in an atmosphere of an inert gas incapable of supporting combustion such as nitrogen or the gases of the zero group of the periodic table, although the heating can be effected in air. However, all gases incapable of supporting combustion under the aforementioned conditions of thermal decomposition are not equally desirable. For example, I have obtained consistently inferior results when effecting the thermal decomposition in the presence of reducing gases such as hydrogen.

The highly active and selective catalyst useful for the oxidation of olefins to olefin oxides of my invention comprises from about 3 to 30 weight percent of elemental silver distributed upon the surface and throughout the pores of a carrier selected from the group consisting of alpha alumina and silicon carbide. It is essential for the purposes of my invention that the carrier have an average porosity of at least 35% and preferably from 35 to 65%.

As heretofore mentioned, the nature of the carrier employed in the praparation of the catalyst of my invention is of prime importance in procuring a catalyst capable of functioning efficiently. In the case of alumina I have discovered that the alpha form alone of the allotropic forms of alumina is useful for my purposes. Alpha alumina is prepared by heating aluminum oxide to a temperature which is capable of effecting a substantially complete conversion to the alpha form, i.e., a temperature of about 1500° C. to a temperature of about or slightly in excess of 2050° C. Moreover, I have found that only those alpha aluminas and silicon carbides having an average porosity of at least 35%, preferably 35% to 65%, comprise useful carriers for the preparation of the catalyst of my invention. This porosity must consist largely of intercommunicating pores and should not be merely sealed-off bubbles.

In the preparation of the catalysts of my invention, care should be taken to avoid the introduction of appreciable quantitities of iron or chromium compounds such as the oxides of these metals, inasmuch as their presence tends to increase the amount of carbon dioxide formed during the oxidation of ethylene. Such objectionable materials can most advantageously be removed by washing the carrier with a solution comprising a low molecular weight organic acid, such as lactic acid or a solution of lactic acid. In particular, I have found that washing the carrier with a 20 to 30 weight percent hot lactic acid solution materially aids in the preparation of a valuable oxidation catalyst. After the acid washing the carrier should be washed with water, until the washings are substantially neutral. Moreover, the catalyst of my invention need not contain the usual promoting trace materials such as various compounds of the alkali metal group, since these promoting trace materials do not improve to any appreciable degree, if at all, the catalyst's efficiency.

The impregnation of the catalyst is preferably effected at an elevated temperature. Thus, for example, when a 50% to 65% silver lactate solution is used as the impregnating solution, a temperature within the range of 100° C. to 150° C. and preferably between about 120 and 130° C. is to be preferred. The carrier should remain immersed in the solution for an extended period, such as 2 to 10 hours, and preferably from about 2½ to 4 hours. At the end of this period, the solution of the silver salt is drained off, and the wet impregnated carrier is placed in an externally heated tube or muffle furnace, and dried and heated at a temperature of from about 350° C. to 425° C., and preferably from about 390° to 410° C. During this heating period which is generally continued for from about 10 to 30 hours, and preferably from about 12 to 16 hours a gas such as air or more preferably an inert gas such as nitrogen is continuously introduced into the furnace at a rate sufficient to remove the gaseous decomposition products. The catalyst material thus obtained has a silver content of from about 3 to 30% and preferably between about 5 and 12%.

It is desirable that the aforementioned heating to decompose the silver salt be conducted at a temperature not in substantial excess of 425° C. I have found that at temperatures much in excess of this temperature level, i.e., 450° C. and above, the activity of the catalyst obtained is substantially reduced.

Conventional oxidizing conditions can be employed for the production of olefin oxides from olefins in accordance with the catalysts of my invention. I prefer, however, an oxidative temperature within the range of 200 to 325° C., and most preferably within the range 230 to 280° C. Thus, for example, in the oxidation of ethylene to ethylene oxide, a gaseous mixture comprising ethylene and a gas comprising molecular oxygen, such as air, is contacted with the aforementioned oxidation catalysts at a temperature of the order of 230 to 280° C. with the ethylene being present in said mixture in a concentration of about 2% to 5%, preferably about 3.5% to 4%. The contact-time of the gas mixture with the catalyst under such conditions should preferably be under eight seconds, with a preferred contact-time comprising between two and seven seconds. The ethylene oxide thus produced can be isolated in a known manner and the remainder of the effluent gases from the process vented to the atmosphere, or if deemed desirable, recycled.

The catalysts of my invention can be used in any of the conventional catalytic procedures. For example, when the catalyst is particulated to a mesh size of about 80 mesh and smaller, the fluidized catalytic mode of operation can be utilized. Thus, the catalyst particles can be disposed in the form of a fluid bed, that is as a bed of fine particles suspended in the olefin and molecular oxygen reactant gases in the so-called fluidized state. In this state the suspended particles undergo the phenomenon of hindered settling, and also, exhibit many of the properties of a boiling liquid. If desired, the fluidized particles can be transferred by means of a conduit from one reactor to another.

Another procedural mode of operation that can be utilized with the catalyst of my invention involves the disposition of the oxidation catalyst particles in the form of a stationary fixed bed. Thus, the particles can be packed in either a single bed or if desired in a plurality of beds, and the olefin and molecular oxygen passed through the bed or beds at the oxidizing conditions.

As illustrative of my invention, a number of catalysts were prepared in accordance with the procedures outlined above, under the conditions specifically listed in Table 1 below, and then used as a catalyst for the oxidation of ethylene in admixture with air to ethylene oxide under the conditions specified in Table 1 below. The oxidation was effected in each case in a reactor tube having an internal diameter of 0.82" and being 3" in length, mounted vertically within an enclosing jacket in which a suitable heat transfer medium was employed to remove the heat of reaction.

Table 1

| Carrier | Impregnation Operation | | Decomposition Operation | | | | Percent Ag in Finished Catalyst | Oxidation | | | Results | |
|---|---|---|---|---|---|---|---|---|---|---|---|---|
| | Time (hrs.) | Temp. (° C.) | Percent Ag Lactate in Solution | Time (hrs.) | Temp. (° C.) | Atmosphere | | Temp. (° C.) | Contact Time (Secs.) | Percent $C_2H_4$ in Feed | $C_2H_4$ Conversion, Percent | Yield, $C_2H_4O$ on $C_2H_4$ Feed Percent of Theory |
| RA-98LY-10 [1] I.P. ring pellets. | 2.5 | 125 | 48.8 | 15¼ | 400 | $N_2$ | 8.0 | 273 | 4.3 | 3.5 | 88 | 55 |
| | | | | | | | | 276 | 3.6 | 3.5 | 90 | 56 |
| | | | | | | | | 271 | 5.3 | 3.5 | 97 | 54 |
| | | | | | | | | 276 | 5.3 | 3.5 | 91 | 59 |
| RA-98 Alundum [2] (porous aggregate). | 3.0 | 125 | 55.6 | 15 | 400 | $N_2$ | 6.9 | 273 | 4.3 | 3.5 | 90 | 58 |
| | | | | | | | | 276 | 3.6 | 3.5 | 93 | 57 |
| | | | | | | | | 269 | 5.3 | 3.5 | 97 | 55 |
| Do | 3.0 | 125 | 56.7 | 15 | 400 | $N_2$ | 7.2 | 270 | 4.3 | 3.5 | 94 | 55 |
| | | | | | | | | 270 | 3.6 | 3.5 | 94 | 55 |
| | | | | | | | | 267 | 5.3 | 3.5 | 95 | 55 |
| | | | | | | | | 273 | 5.3 | 3.5 | 99 | 53 |
| Do | 3.0 | 125 | 56.2 | 8 | 400 | $N_2$ | 9.2 | 284 | 4.3 | 3.5 | 97 | 55 |
| | | | | | | | | 264 | 5.3 | 3.5 | 92 | 59 |
| | | | | | | | | 250 | 4.3 | 3.5 | 94 | 51 |
| Do | 3.0 | 125 | 56.7 | 15 | 400 | $CO_2$ | 6.6 | 248 | 4.3 | 3.5 | 94 | 50 |
| | | | | | | | | 235 | 5.3 | 3.5 | 86 | 50 |
| | | | | | | | | 243 | 9.4 | 3.5 | 91 | 59 |
| Do | 3.0 | 125 | 54.5 | 15 | 400 | Air | 8.9 | 266 | 6.6 | 3.5 | 96 | 52 |
| | | | | | | | | 269 | 5.3 | 3.5 | 92 | 59 |
| | | | | | | | | 278 | 3.6 | 3.5 | 91 | 54 |
| | | | | | | | | 262 | 4.3 | 3.5 | 92 | 65 |
| T-71 Corundum [3] (porous aggregate). | 3.0 | 125 | 55.6 | 15 | 395 | Air | 10.0 | 270 | 5.3 | 3.5 | 91 | 60 |
| | | | | | | | | 271 | 3.8 | 3.5 | 93 | 57 |
| | | | | | | | | 268 | 4.1 | 3.5 | 95 | 58 |

Table 1—Continued

| Carrier | Impregnation Operation | | Decomposition Operation | | | | Percent Ag in Finished Catalyst | Oxidation | | | Results | |
|---|---|---|---|---|---|---|---|---|---|---|---|---|
| | Time (hrs.) | Temp. (° C.) | Percent Ag Lactate in Solution | Time (hrs.) | Temp. (° C.) | Atmosphere | | Temp. (° C.) | Contact Time (Secs.) | Percent $C_2H_4$ in Feed | $C_2H_4$ Conversion, Percent | Yield, $C_2H_4O$ on $C_2H_4$ Feed Percent of Theory |
| T-72 Corundum [4] (porous aggregate). | 3.0 | 125 | 56.0 | 15 | 400 | Air | 8.5 | 262 | 5.2 | 3.5 | 77 | 26 |
| | | | | | | | | 261 | 4.8 | 3.5 | 60 | 26 |
| | | | | | | | | 265 | 4.3 | 3.5 | 65 | 32 |
| | | | | | | | | 270 | 5.3 | 3.5 | 86 | 43 |
| RC-Crystolon [5] (porous aggregate-silicon carbide). | 3.5 | 130 | 54.1 | 15 | 400 | $N_2$ | 8.3 | 273 | 4.3 | 3.5 | 78 | 47 |
| | | | | | | | | 272 | 3.6 | 3.5 | 77 | 41 |
| | | | | | | | | 252 | 9.4 | 3.5 | 89 | 43 |
| Aloxite [6] (alpha alumina pellets). | 3.0 | 125 | 55.0 | 17 | [10] 400 | Air | 10.5 | 254 | 5.3 | 3.5 | 87 | 47 |
| | | | | | | | | 243 | 12.0 | 3.5 | 94 | 54 |
| | | | | | | | | 264 | 5.3 | 3.5 | 32 | 17 |
| #38 [7] (alpha alumina) | 3.5 | 125 | 56.1 | 15 | 400 | Air | 8.5 | 261 | 4.3 | 3.5 | 29 | 18 |
| | | | | | | | | 263 | 6.6 | 3.5 | 37 | 23 |
| | | | | | | | | 211 | 12.0 | 3.5 | 100 | 0 |
| AL-1 [8] (aluminum oxide) | 2.0 | 100 | 55.0 | 9 | 400 | Air | 7.5 | 212 | 9.4 | 3.5 | 100 | 0 |
| | | | | | | | | 214 | 6.6 | 3.5 | 100 | 0 |
| | | | | | | | | 254 | 9.4 | 3.5 | 87 | 50 |
| Silicon Carbide [9] (cylindrical pellets). | 2.0 | 125 | 59.0 | 20 | 400 | Air | 14.7 | 269 | 9.4 | 3.5 | 94 | 49 |
| | | | | | | | | 270 | 5.3 | 3.5 | 85 | 45 |
| | | | | | | | | 275 | 6.6 | 3.5 | 89 | 44 |

[1] A grade of alpha alumina formed catalyst carrier sold by the Norton Company of Worcester, Mass. (hollow rings ⅛" diameter by 3/16" length; average porosity of 42% to 45%; and having the following compositions: 85.5% $Al_2O_3$, 12.1% $SiO_2$, 0.5% $Fe_2O_3$, 0.2% MgO, 0.2% CaO, 0.4% $Na_2O$, and 0.3% $K_2O$).

[2] A grade of alpha alumina 4 to 8 mesh particles sold by the Norton Company of Worcester, Mass. (average porosity of 42% to 45%; composition same as RA-98LX-10).

[3] A grade of alpha alumina 4 to 8 mesh particles sold by the Aluminum Ore Company of East St. Louis, Illinois (average porosity of 55% to 75% and having the following compositions: 99.5% $Al_2O_3$, 0.02% $Na_2O$, 0.02% $SiO_2$, and 0.035% $Fe_2O_3+TiO_2$).

[4] Identical with T-71 except that average porosity is 25% to 30%.

[5] A grade of silicon carbide in the form of porous aggregate 4 to 8 mesh sold by the Norton Company of Worcester, Mass. (average porosity of 35% to 40% and having the following composition: 83.5% SiC, 10% $SiO_2$, 4.9% $Al_2O_3$, 0.4% $Fe_2O_3$, 0.2% MgO, 0.2% CaO, 0.3% $Na_2O$, 0.2% $K_2O$, and 0.3% $TiO_2$).

[6] A grade of alpha alumina in the form of cylindrical pellets 3/16" in diameter by 3/16" long; average porosity 40% to 45% having the following composition: 79.3% $Al_2O_3$, 13.0% $SiO_2$, 2.7% silicates of Fe, Al, Mg, K, Na, and Ti sold by the Corundum Co. of Perth Amboy, N.J.

[7] A grade of alpha alumina sold by the Norton Co. of Worcester, Mass.; average porosity 2% to 5% and having the following composition: 99.46% $Al_2O_3$, .05% $SiO_2$, .02% $Fe_2O_3$, .04% $TiO_2$, 0.35% $Na_2O+K_2O$.

[8] A grade of alumina consisting chiefly of the gamma form with a small proportion of beta alumina sold by the Harshaw Chemical Co. of Cleveland, Ohio; average porosity 41% to 48% and having the following composition: 98% $Al_2O_3$, 0.75% $Na_2O$, 0.04% $Fe_2O_3$, and 0.2% $SiO_2$.

[9] A grade of silicon carbide in the form of cylindrical pellets 3/16" in diameter by 3/16" long; average porosity 40% to 45% having the following composition: 77.5% SiC, 6.4% $Al_2O_3$, 14.6% $SiO_2$, and 1.5% of Fe, Al, Ti, Mg, Na, and K silicates. Sold by the Carborundum Co. of Perth Amboy, N.J.

[10] Two hrs. @ 125° C., two hrs. @ 200° C., thirteen hrs. @ 400° C.

It is seen from the foregoing that the ethylene oxidation runs using the catalysts of my invention namely those in which the silver has been impregnated on a carrier consisting of alpha alumina or silicon carbide having an average porosity in excess of 35%, furnished vastly superior results when compared with similar runs utilizing catalysts prepared in the identical manner from carriers having either a lower porosity, or consisting of the beta and gamma forms of alumina.

While I have described in some detail the preferred embodiments of my invention, and certain variations thereof, it is to be understood that such is only for the purposes of illustration and that the invention is not to be regarded as limited to the details and procedure herein described. On the other hand, the invention is to be regarded as limited only by the terms of the accompanying claims, in which it is my intention to claim the novelty inherent in my invention as broadly as possible in view of the prior art.

Having described my invention what I claim as new and desire to protect by Letters Patent is the following:

1. A process for preparing a highly active and selective catalyst for use in catalyzing the oxidation of olefins to olefin oxides which comprises washing an alpha alumina having an average porosity of between 35 and 65% with an aqueous solution of lactic acid, washing the alpha alumina thus treated with water until the washings are substantially neutral, then impregnating the so prepared alpha alumina with an aqueous solution of silver lactate, drying and heating the impregnated alpha alumina at a temperature below about 425° C. for a time sufficient to remove the anionic constituent of the silver lactate and to deposit elemental silver in a highly active form upon the surface and throughout the pores of the alpha alumina.

2. A process for preparing a highly active and selective catalyst for use in catalyzing the oxidation of olefins to olefin oxides which comprises washing an alpha alumina having an average porosity of between 35 and 65% with an aqueous solution of lactic acid, washing the alpha alumina thus treated with water until the washings are substantially neutral, impregnating the washed alpha alumina with a 50 to 65% aqueous solution of silver lactate, drying and heating the impregnated alpha alumina at a temperature of about 350 to 425° C. in an atmosphere of an inert gas for a time sufficient to remove the anionic constituent of the silver lactate and to deposit elemental silver in a highly active form upon the surface and throughout the pores of the alpha alumina.

3. A process for preparing a highly active and selective catalyst for use in catalyzing the oxidation of olefins to olefin oxides which comprises washing an alpha alumina having an average porosity of between 35 and 65% with an aqueous solution comprising between about 20 to 30% lactic acid, washing the alpha alumina thus treated with water until the washings are substantially neutral, impregnating the washed alpha alumina with a 50 to 65% aqueous solution of silver lactate, drying and heating the impregnated alpha alumina at a temperature of about 350 to 425° C. in an atmosphere of an inert gas for a time sufficient to remove the anionic constituent of the silver lactate and to deposit elemental silver in a highly active form upon the surface and throughout the pores of the alpha alumina.

4. In a method for preparing a highly active and selective catalyst composition for use in catalyzing the oxidation of ethylene to ethylene oxide, the steps which comprise thoroughly washing an alpha alumina having an average porosity of between 35% and 65% with lactic acid, washing the material thus treated with water until the washings are substantially neutral, thereafter impregnating the washed alpha alumina with a 50% to 65% aqueous solution of silver lactate, drying and heating the so impregnated alpha alumina at about 350–425° C. in an atmosphere of an inert gas for a time sufficient to remove the anionic constituent of said silver salt, thereby leaving free silver in a highly active form deposited upon the surface and throughout the pores of said alpha alumina.

References Cited in the file of this patent

UNITED STATES PATENTS

| | | |
|---|---|---|
| 2,040,782 | Van Peski | May 12, 1936 |
| 2,307,421 | Overhoff | Jan. 5, 1943 |
| 2,404,438 | Evans | July 23, 1946 |
| 2,408,131 | Voorhies | Sept. 24, 1946 |
| 2,424,083 | Finch et al. | July 15, 1947 |
| 2,458,266 | Heider et al. | Jan. 4, 1949 |
| 2,477,435 | Aries | July 26, 1949 |